(12) United States Patent
Inami

(10) Patent No.: US 9,122,379 B2
(45) Date of Patent: Sep. 1, 2015

(54) PORTABLE WIRELESS TERMINAL, WIRELESS COMMUNICATION METHOD AND CONTENT REFERENCE SYSTEM

(71) Applicant: KYOCERA CORPORATION, Kyoto (JP)

(72) Inventor: Akiko Inami, Gifu (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/106,513

(22) Filed: Dec. 13, 2013

(65) Prior Publication Data

US 2014/0108944 A1    Apr. 17, 2014

Related U.S. Application Data

(63) Continuation of application No. 13/056,544, filed as application No. PCT/JP2009/063530 on Jul. 29, 2009, now abandoned.

(30) Foreign Application Priority Data

Jul. 29, 2008    (JP) ................................. 2008-195033

(51) Int. Cl.
```
G06F 3/0484      (2013.01)
G06F 17/30       (2006.01)
H04L 29/08       (2006.01)
```
(52) U.S. Cl.
CPC .......... *G06F 3/0484* (2013.01); *G06F 17/3002* (2013.01); *H04L 67/06* (2013.01)

(58) Field of Classification Search
CPC ... G06F 17/30; G06F 17/305; G06F 17/3002; G06F 3/0481; G06F 3/04817; G06F 3/0482; G06F 3/0484; H04L 67/06

USPC .......... 709/202, 203, 219–227, 233; 707/102, 707/200, 204; 713/165
See application file for complete search history.

(56) References Cited

U.S. PATENT DOCUMENTS

2002/0087622 A1*  7/2002 Anderson .................... 709/203
2002/0099769 A1   7/2002 Yasui et al.
(Continued)

FOREIGN PATENT DOCUMENTS

JP    2002-216021 A    8/2002
JP    2004-070614 A    3/2004
(Continued)

OTHER PUBLICATIONS

An Office Action; "Decision of Rejection," issued by the Japanese Patent Office on Apr. 1, 2014, which corresponds to Japanese Patent Application No. 2012-129401 and is related to U.S. Appl. No. 14/106,513; with English language concise explanation.

(Continued)

*Primary Examiner* — Kambiz Zand
*Assistant Examiner* — Noura Zoubair
(74) *Attorney, Agent, or Firm* — Studebaker & Brackett PC

(57) ABSTRACT

A portable wireless terminal 110 includes a terminal display section 214, a terminal memory 212 that stores upload information for specifying the content uploaded to an arbitrary external server, a terminal information display section 242 that displays the information of the content specified by the upload information on the terminal display unit, a terminal deletion receiving section 244 that receives one or more pieces of content to be deleted from the displayed information of the content, and a content deletion section 246 that deletes the content to be deleted which is received by the terminal deletion receiving section, from an external server 150.

7 Claims, 10 Drawing Sheets

(56) References Cited

U.S. PATENT DOCUMENTS

| | | | |
|---|---|---|---|
| 2005/0114389 A1* | 5/2005 | Kamiya | 707/102 |
| 2006/0101082 A1* | 5/2006 | Agrawal et al. | 707/200 |
| 2007/0120963 A1 | 5/2007 | Leem | |
| 2008/0059614 A1* | 3/2008 | Kim et al. | 709/221 |

FOREIGN PATENT DOCUMENTS

| | | |
|---|---|---|
| JP | 2004-094461 A | 3/2004 |
| JP | 2005-020582 A | 1/2005 |
| JP | 2006-245748 A | 9/2006 |
| JP | 2007-089186 A | 4/2007 |
| JP | 2007-286664 A | 11/2007 |
| JP | 2007-312240 A | 11/2007 |
| JP | 2008-054304 A | 3/2008 |
| JP | 2008-067334 A | 3/2008 |
| JP | 20098-109235 A | 5/2008 |
| JP | 2009-020862 A | 1/2009 |

OTHER PUBLICATIONS

JP Office Action; "Notification of Reason for Refusal"; JP2008-195033; Dec. 6, 2011.

JP Office Action; "Notice of Reasons for Rejection"; JP2012-129401; Jul. 23, 2013.

JP Office Action; "Decision of Refusal"; JP2008-195033; Mar. 6, 2012.

An Office Action; "Notice of Reasons for Rejection," issued by the Japanese Patent Office on May 12, 2015, which corresponds to Japanese Patent Application No. 2014-136135 and is related to U.S. Appl. No. 14/106,513; with English language concise explanation.

* cited by examiner

FIG. 5

| TYPE ID | DATA TYPE |
|---|---|
| 1 | MOVING PICTURE |
| 2 | STILL IMAGE |
| 3 | VOICE |
| ⋮ | ⋮ |

FIG. 6

| SITE ID | SITE NAME | URL | ACCOUNT | PASSWORD |
|---------|-----------|-----|---------|----------|
| 0 | — | — | — | — |
| 1 | MOVING PICTURE SITE A | http//:aaaa@aaa.co.jp | ACCOUNT A | PASSWORD A |
| 2 | MOVING PICTURE SITE B | http//:bbbb@bbb.co.jp | ACCOUNT B | PASSWORD B |
| 3 | MOVING PICTURE SITE C | http//:cccc@ccc.co.jp | ACCOUNT C | PASSWORD C |
| ... | ... | ... | ... | ... |

270

PORTABLE WIRELESS TERMINAL, WIRELESS COMMUNICATION METHOD AND CONTENT REFERENCE SYSTEM

TECHNICAL FIELD

The present invention relates to a portable wireless terminal, a wireless communication method and a content reference system which are capable of referring to content uploaded to an external server.

BACKGROUND ART

In recent years, portable wireless terminals such as portable telephone and PHS (Personal Handy phone System) terminal are widely spread, so that it is possible to make a call or to obtain information regardless of location or time. In particular, an amount of information that can be obtained is recently increased and a wireless communication method of high speed and high quality is adopted so as to download a large amount of data. The wireless communication method can transmit the large amount of data in the upload as well as in the download.

In addition, a technology is established which makes public contents such as images (still images and moving pictures) captured in the portable wireless terminal and voice to an external server on the Internet, through the data upload in the portable wireless terminal The contents that have been once made public are freely available by unspecified persons.

Conventionally, the upload of content has required somewhat knowledge about a computer. However, a technology has been recently known which can automatically upload content such as still image and moving picture to a storage, which is provided at the outside, by an easy operation of simply pushing an upload button.

In addition, regarding a using method of the uploaded content, a technology has been known which totals vote information related to a specific image of an uploaded image group and determines content to be displayed on another terminal on the basis of the final total of the vote information.

SUMMARY OF THE INVENTION

Problems to be Solved

The content that is uploaded through the above technologies and the like is managed by a content ID that is provided on the basis of account information such as a user ID capable of specifying a user, a terminal ID capable of specifying a portable wireless terminal and the like. Accordingly, even when a user tries to delete the content from the external server so as to stop the content from being made public, the content ID that is provided at the time of upload is required.

In addition, since the content ID is kept in the portable wireless terminal in many cases, a problem may be caused when canceling the portable wireless terminal. For example, in a dedicated server of a communication provider providing a wireless communication system by a portable wireless terminal, the uploaded content is deleted with the cancellation and does not remain against a user's intention. However, when an upload destination is an external server that is not related to the communication provider, the content remains unless a deletion process is individually executed.

When a user tries to delete the content remaining in the external server after canceling the portable wireless terminal, the wireless communication has been already disconnected, so that it is not possible to directly delete the content from the external server with the portable wireless terminal. Accordingly, the user is forced to perform a troublesome operation of specifically extracting a plurality of content IDs from the portable wireless terminal after the cancellation one by one, which are required to be deleted, and then deleting the contents through a separate portable wireless terminal or personal computer. Furthermore, when the content ID is associated with the account information of the canceled portable wireless terminal, a situation may be caused in which the content cannot be deleted from another terminal. In addition, when the content ID itself is deleted or lost by mistake, the content cannot be deleted.

Depending on the external servers, the content ID may be re-transmitted by a reminder and the like. However, since the transmission destination is a registered mail address, i.e., mail address of the canceled portable wireless terminal in many cases, it is not possible to receive the content ID.

Accordingly, when a user carelessly cancels the portable wireless terminal without considering the deletion of the uploaded content, the user should exert great efforts to delete the content later.

In view of the above problems, an object of the present invention is to provide a portable wireless terminal, a wireless communication method and a content reference system which allow a user to check an uploaded state of content. Another object of the present invention is to provide a portable wireless terminal, a wireless communication method and a content reference system which are capable of avoiding a situation in which content to be deleted remains in an external server.

Means for Solving the Problems

A portable wireless terminal according to an aspect of the present invention comprises: a terminal display section; a terminal memory that stores upload information for specifying content uploaded to an external server; a terminal information display section that displays information of the content specified by the upload information on the terminal display section; a terminal deletion receiving section that receives a designation of one or more pieces of content to be deleted from the displayed information of the content; and a content deletion section that deletes content to be deleted which is received by the terminal deletion receiving section, from the external server.

A portable wireless terminal according to an aspect of the present invention comprises: a terminal display section; a terminal memory that stores upload information for specifying content uploaded to an external server; and a terminal information display section that displays the upload information on the terminal display section when a communication function of the portable wireless terminal is cancelled or internal information of the portable wireless terminal is deleted.

A wireless communication method according to an aspect of the present invention comprises: storing upload information for specifying content uploaded to an external server; displaying information of the content specified by the upload information on a terminal display section; receiving one or more pieces of content to be deleted from the displayed information of the content; and deleting the received content to be deleted from the external server.

A content reference system according to an aspect of the present invention comprises a portable wireless terminal and a management server connected to the portable wireless terminal. The management server includes: a server display section; an information acquisition section that acquires upload information for specifying content, which is uploaded to an external server by the portable wireless terminal, from a terminal memory of the portable wireless terminal; a server information display section that displays information of the content specified by the upload information on the server display section; a server deletion receiving section that receives a designation of one or more pieces of content to be deleted from the displayed information of the content; and a deletion content notification section that notifies the portable wireless terminal of the content to be deleted which is received by the server deletion receiving section. The portable wireless terminal includes: a terminal memory that stores the upload information; and a content deletion section that deletes the content notified from the deletion content notification section, from the external server.

Effects of the Invention

According to the above configurations, it is possible to allow a user to check the uploaded state of content by uniform means. In addition, it is possible to avoid a situation in which content to be deleted remains in an external server.

BRIEF DESCRIPTION OF THE DRAWINGS

FIG. 5 illustrates a configuration of a table according to the first embodiment.

FIG. 6 illustrates a configuration of a table according to the first embodiment.

DETAILED DESCRIPTION OF EMBODIMENTS

Figure 1:
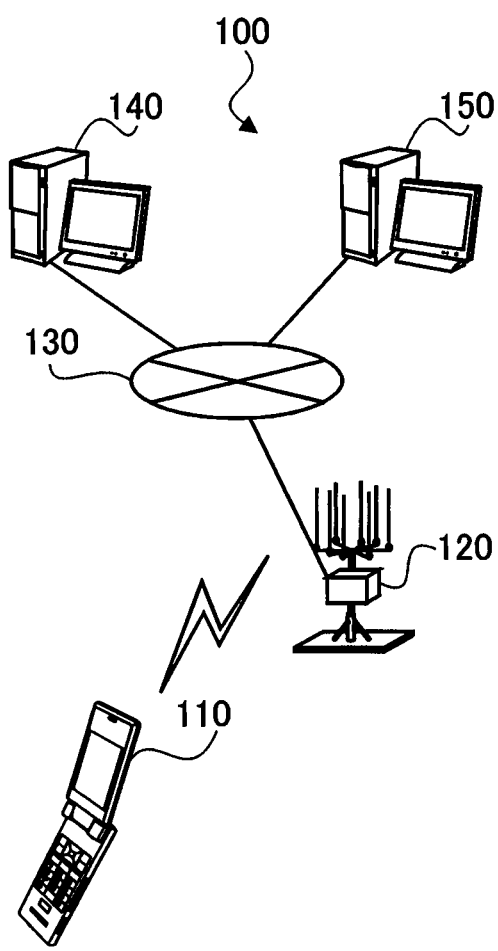
FIG. 1 illustrates a schematic connection relation of a content reference system according to a first embodiment.

Hereinafter, preferred embodiments of the invention will be specifically described with reference to the drawings. The sizes, materials and other specific numerical values of the embodiments are exemplified so as to easily understand the invention and are not to limit the invention unless particularly mentioned otherwise. Meanwhile, in the specification and drawings, the elements having the substantially same functions and configurations are indicated with the same reference numerals and the overlapped explanations will be omitted. In addition, the elements that are not directly related to the invention will not be shown.

First Embodiment

A portable wireless terminal such as portable telephone and PHS terminal establishes a wireless communication system that performs wireless communication with a base station that is set up at a predetermined location. Herein, in order to easily understand the invention, the wireless communication system will be first described and then a specific configuration of the portable wireless terminal and a wireless communication method will be described.

(Wireless Communication System 100)

FIG. 1 illustrates a schematic connection relation of a wireless communication system 100. The wireless communication system 100 includes a portable wireless terminal 110, a base station 120, a communication network 130 configured by ISDN (Integrated Services Digital Network) line, Internet, dedicated line and the like, a relay server 140, and an external terminal 150.

In the wireless communication system 100 of this embodiment, when a user tries to upload content with the portable wireless terminal 110, the portable wireless terminal 110 transmits a request for wireless connection to the base station 120 that is within a communication range. The base station 120 having received the request for wireless connection transmits a request for communication connection with the external server 150 to the relay server 140 through the communication network 130. The relay server 140 secures a communication path between the base station 120 and the external server 150. Accordingly, the communication between the portable wireless terminal 110 and the external server 150 is established.

The portable wireless terminal 110 uploads the content held therein to a server storage of the external server 150 and the external server 150 makes public the content to an access of another user. Typically, the uploaded content keeps remained in the external server 150 unless it is intentionally deleted. In the meantime, another user can look through the public content through an external terminal (not shown) connected to the communication network.

In this embodiment, the user can uniformly check the content uploaded from the portable wireless terminal 110. In addition, it is possible to avoid a situation in which content to be deleted keeps remained. A configuration of the portable wireless terminal 110 realizing this embodiment will be described in the below.

(Portable Wireless Terminal 110)

Figure 2:
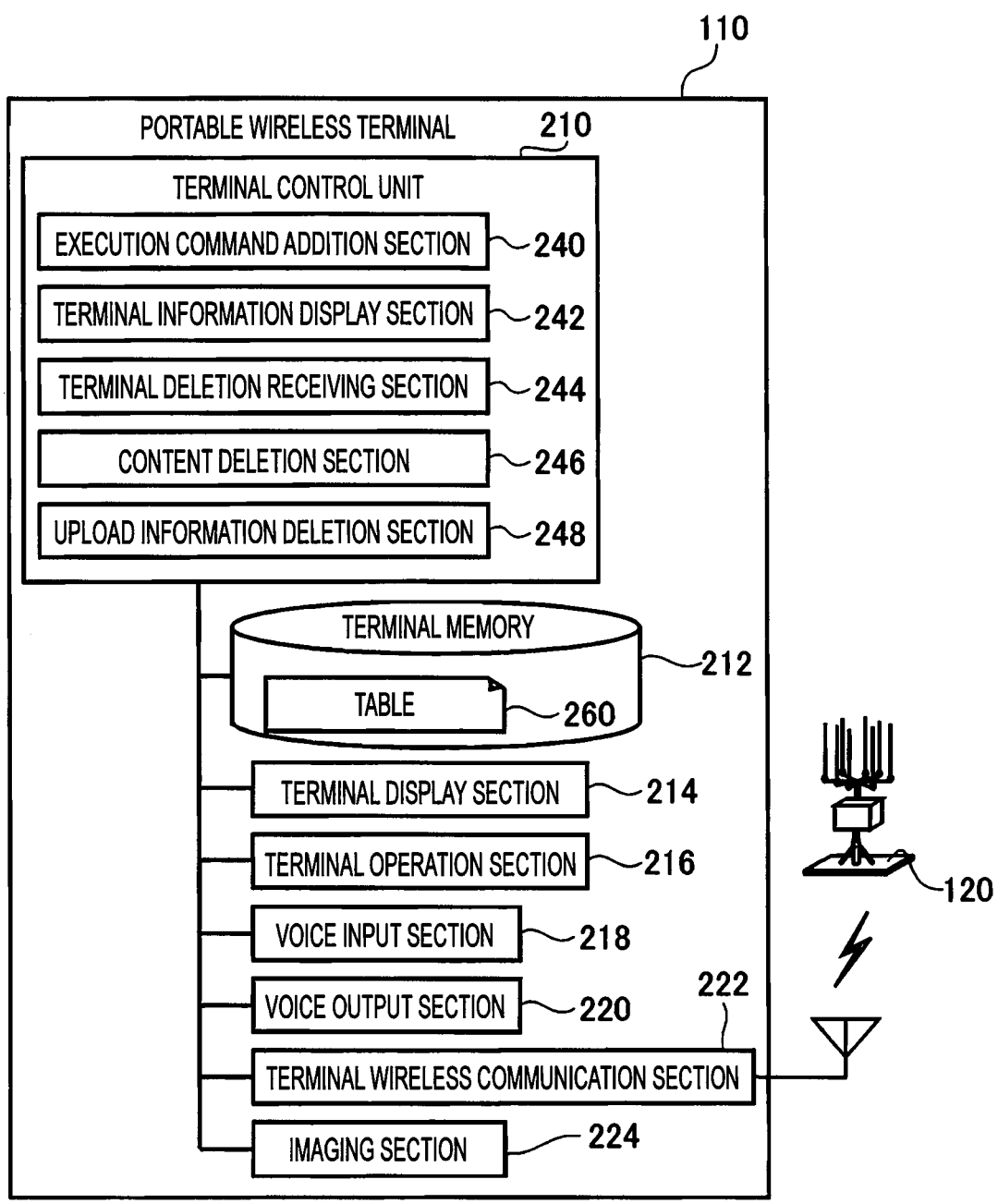
FIG. 2 is a function block diagram showing a hardware configuration of a portable wireless terminal according to the first embodiment.
Figure 3:
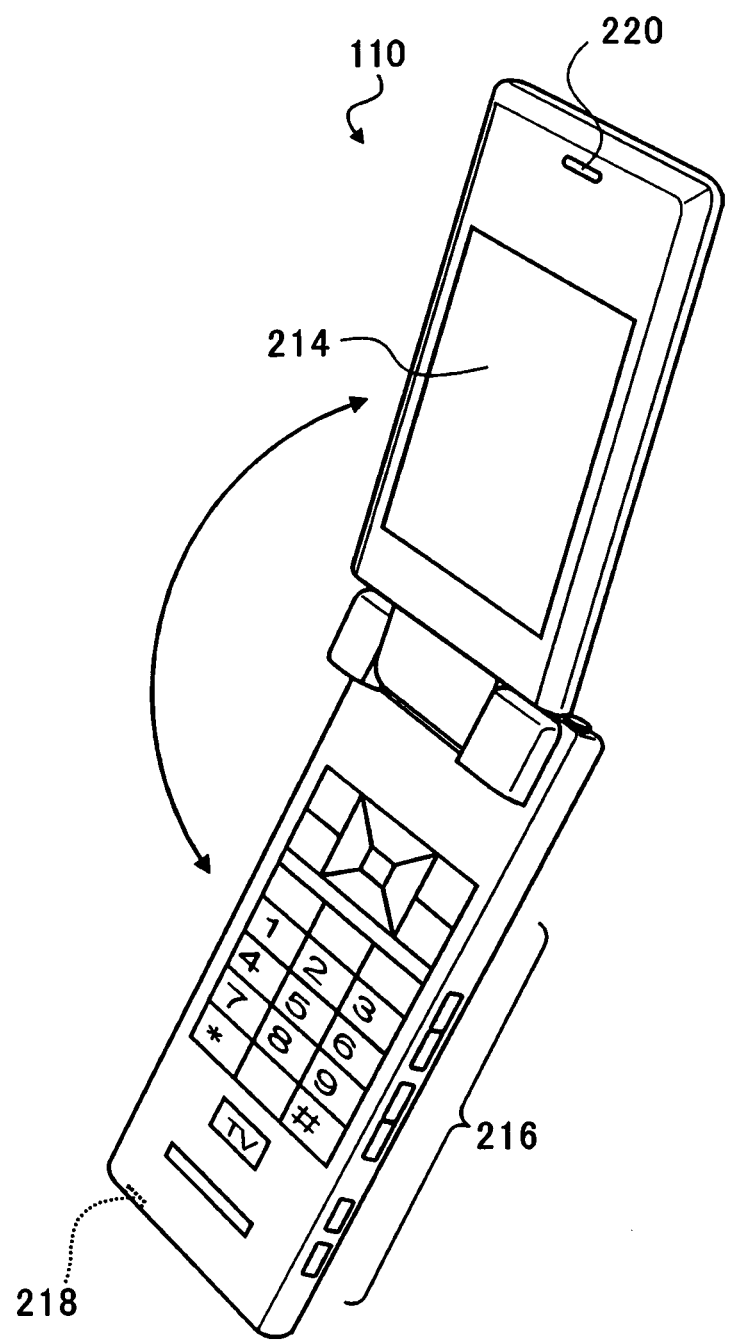
FIG. 3 is a perspective view showing an outward appearance of a portable wireless terminal 110 according to the first embodiment.

FIG. 2 is a function block diagram showing a hardware configuration of the portable wireless terminal 110 and FIG. 3 is a perspective view showing an outward appearance of the portable wireless terminal 110. The portable wireless terminal 110 includes a terminal control unit 210, a terminal memory 212, a terminal display section 214, a terminal operation section 216, a voice input section 218, a voice output section 220, a terminal wireless communication section 222 and an imaging section 224.

Herein, the portable telephone is exemplified as the portable wireless terminal 110. However, the present invention is not limited thereto. For example, a variety of electronic devices capable of performing wireless communication such as PHS terminal, note-type personal computer, PDA (Personal Digital Assistant), digital camera, music player, car navigation, portable TV, gaming device, DVD player, remote controller and the like can be applied.

The terminal control unit 210 manages and controls the portable wireless terminal 110 by a semiconductor integrated circuit including a central processing unit (CPU) and performs calling, mail transmitting and receiving, imaging, music reproducing and TV watching functions by using programs of the terminal memory 212. The terminal memory 212 is configured by a ROM, a RAM, an EEPROM, a non-volatile RAM, a flash memory, an HDD and the like and stores programs, communication data and the like that are processed by the terminal control unit 210. In addition, the terminal memory 212 stores upload information that specifies content uploaded to the arbitrary external server 150 and a table 260 in which the upload information is listed. Herein, the table 260 is used so as to manage the upload information for convenience' sake. However, it is also possible to associate and store one or more pieces of upload information with the contents.

Figure 4:
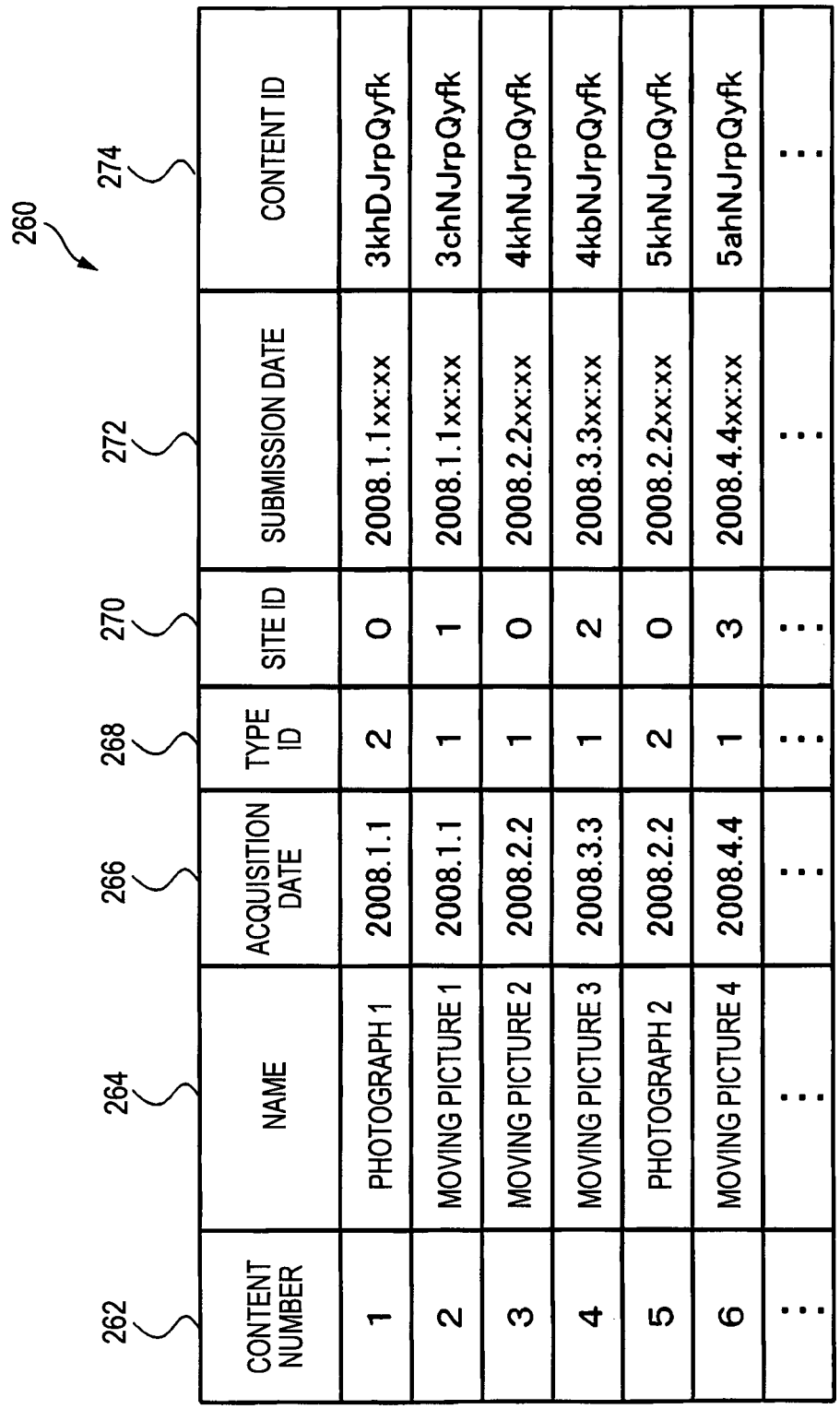
FIG. 4 illustrates a configuration of a table according to the first embodiment.

FIGS. 4, 5 and 6 illustrate a configuration of the table 260. As shown in FIG. 4, the table 260 includes items of a content number 262, a name 264, an acquisition date 266, a type ID 268, a site ID 270, a submission date (upload date) 272 and a content ID 274. In the table 260, a list is formed for each of the uploaded contents.

The content number 262 is a number for identifying uploaded content in the portable wireless terminal 110 and is numbered in registration order to the table 260. The name 264 is a name for identifying content. The acquisition date 266 indicates an imaging date when the content is a picture or moving picture imaged by the imaging section and a recording date when the content is voice. The type ID 268 indicates a type of content as shown in FIG. 5 and has some choices of moving picture, still image and voice. The site ID 270 specifies information of an uploaded site (external server 150), as shown in FIG. 6. Regarding the site ID 270, when a different account is acquired even for the same site, a new site ID is allotted. The submission date 272 indicates a date at which content is uploaded to the site (external server 150) specified by the site ID 270. The content ID 274 is an ID that is given from the external server 150 for each of contents on the basis of the account information such as user ID, terminal ID and the like and is used for modification and deletion of the content. Additionally, in order to specify a moving picture or still image, a thumbnail of content may be added to the table 260 in addition to the name 264.

The terminal display section 214 is configured by a liquid crystal display, an EL (Electro Luminescence) display and the like and can display Web content or GUI (Graphical User Interface) of an application that is stored in the terminal memory 212 or provided from the external server (Web server) 150 through the communication network 140. The terminal operation section 216 is configured by a keyboard, a tenkey, and a movable switch such as joystick and the like and receives an operation input of a user.

The voice input section 218 is configured by voice recognition means such as microphone and the like and converts user's voice, which is input in making a call, into an electric signal that can be processed in the portable wireless terminal 110. The voice output section 220 is configured by a speaker and converts and outputs a voice signal of a called party, which is received in the portable wireless terminal 110, into voice. In addition, the voice output section can also output a ringtone, an operating sound of the terminal operation section 216, an alarm sound and the like.

The terminal wireless communication section 222 establishes wireless communication such as CDMA (Code Division Multiple Access) and WiMAX (Worldwide Interoperability for Microwave Access) with the base station 120 through the network on a common link layer and performs voice communication with a called party or data communication with the external server 150.

The imaging section 224 is configured by an image device such as CCD (Charge Coupled Device) or CMOS (Complementary Metal Oxide Semiconductor) and can capture an image such as still image or moving picture.

In addition, the terminal control unit 210 also serves as an execution command addition section 240, a terminal information display section 242, a terminal deletion receiving section 244, a content deletion section 246 and an upload information deletion section 248.

The execution command addition section 240 adds an execution command of a deletion execution module for deleting content, in addition to upload information, to the table 260 when uploading content to the arbitrary external server 150 in accordance with a user input. Thus, it is possible to associate the execution command with the upload information.

Accordingly, in this embodiment, the execution command addition section 240 specifies the content by the upload information and associates the execution command of the deletion execution module assisting with the deletion of the content with the table 260. The deletion execution module includes access information such as deletion dedicated URL, e-mail address and the like, which are provided from the external server 150, and is formed with an execution format capable of using a content ID to independently delete content, for example a description of 'http://**/***account=1234&contents_id=654321.'

When the uploaded content is included, the terminal information display section 242 displays a deletion confirmation interface 280 of content specified by the upload information on the terminal display section 214.

Figure 7:
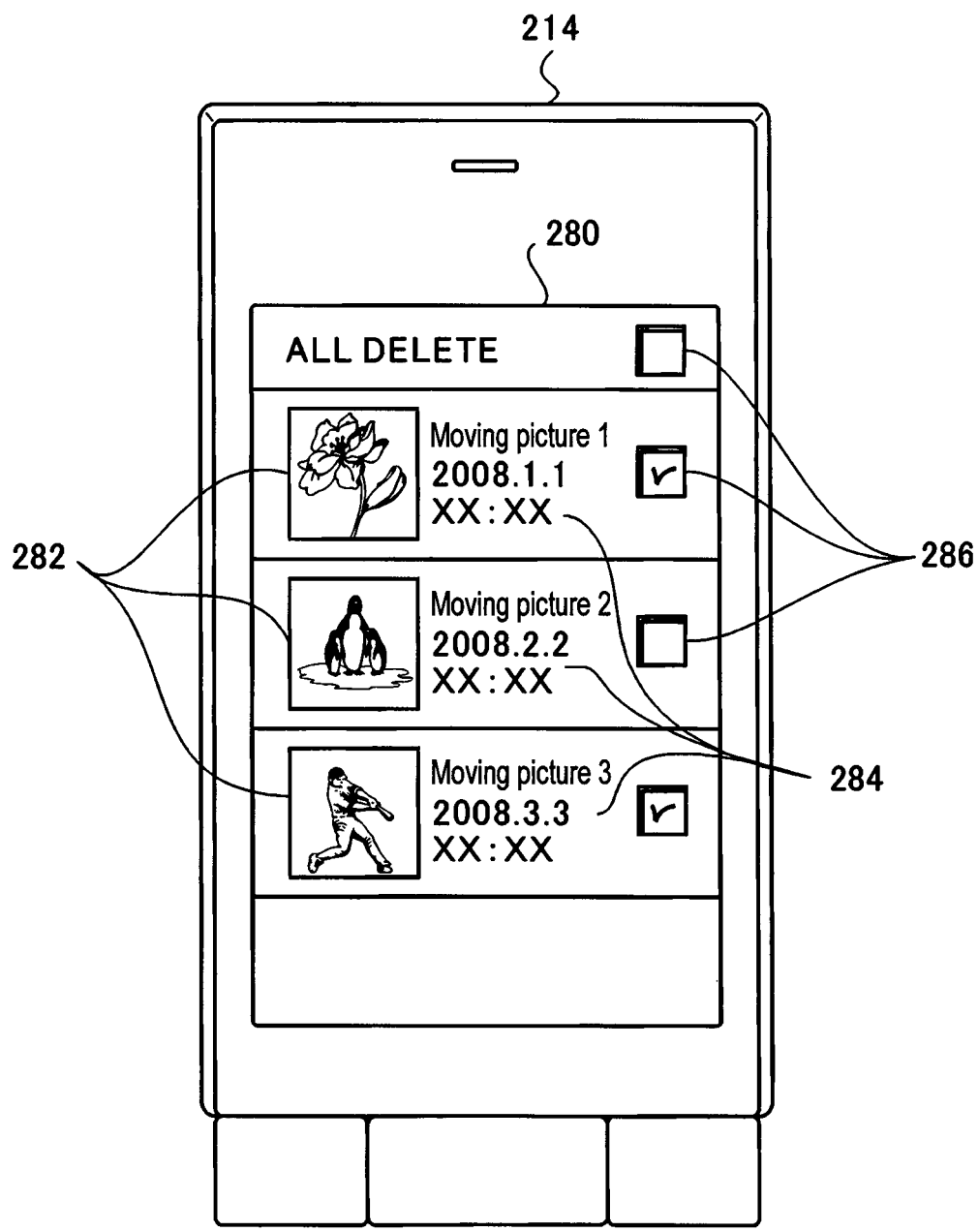
FIG. 7 illustrates a deletion confirmation interface according to the first embodiment.

FIG. 7 illustrates the deletion confirmation interface 280. Here, the deletion confirmation interface 280 is displayed on the terminal display section 214 and the information of content is displayed on the deletion confirmation interface 280. Specifically, thumbnails 282 that simply indicate contents, the upload information 284 and check boxes 286 are displayed. A user checks the check boxes 286 of contents that the user wants to delete while referring to the thumbnails 282 or upload information 284. At this time, although the user can individually delete the contents included in the table 260, the user can forcibly delete all contents by checking "ALL DELETE."

In addition, the terminal information display section 242 may function at least when the communication function of the portable wireless terminal 110 is canceled or the internal information thereof is deleted.

When the communication function is canceled or the internal information is deleted due to the cancellation or reset of the portable wireless terminal 110, a user should exert great efforts to delete the content thereafter. In this embodiment, the terminal information display section 242, which allows the user to check the content and asks the user whether or not to delete the content, is operated at the timing of the communication function cancellation or internal information deletion. Thus, it is possible to avoid a situation in which the user misses the timing of easily deleting the content.

In the meantime, the communication function cancellation means that the communication function of the portable wireless terminal 110 is prohibited (locked) when a user cancels a contract of the portable wireless terminal 110 with a communication provider, for example. In addition, the internal information deletion means that the ID of the portable wireless terminal 110, which is necessary for communication, is deleted or the user (owner) information stored in the terminal memory 212 is deleted to disable the portable wireless terminal 110 from performing the wireless communication.

When one or more pieces of content to be deleted are designated (selected) from the content information displayed via the deletion confirmation interface 280, the terminal deletion receiving section 244 receives the content group as a deletion object.

The content deletion section 246 deletes the content to be deleted which has been received by the terminal deletion receiving section 244 from the external server 150 that is an upload destination. In particular, when the execution command of the deletion execution module is associated with the table 260 by the execution command addition section 240, the content deletion section performs the execution command of the deletion execution module, thereby securely and rapidly deleting the content. At this time, when the content has been already deleted due to the viewable term set in the external server 150, the deletion process is omitted.

The upload information deletion section 248 deletes the upload information of the content, which is deleted by the content deletion section 246, from the table 260.

When the content is deleted, the upload information of the content becomes not necessary at all. Accordingly, the upload information is deleted from the table 260 in conjunction with the content to avoid the unnecessary information from remaining, so that a user just checks the effective content. Here, even when the communication function is canceled or the internal information is deleted, the terminal memory 212 keeps the table 260 until all upload information included in the table 260 is deleted.

Here, the linked operation between the external server 150 that is an upload destination and the table 260 by the upload information deletion section 248 is a mere linked operation with the content kept in the external server 150 and the linked operation is not required for the original data of the content kept in the terminal memory 212 of the portable wireless terminal 110. Accordingly, when the uploaded content is deleted, the upload information is deleted from the table 260 even when the corresponding content in the portable wireless terminal 110 is still present.

The content that is not selected as a deletion object in the above processes is considered as deletion abandonment or reservation. Even after the communication function is canceled or the internal information is deleted, it is possible to delete the content with another portable wireless terminal or personal computer by using the content ID.

In this embodiment, the upload information that is given when the content is uploaded to the external server 150 is listed to generate a table. The terminal information display section 242 can display the upload information in a uniform way by referring to the table, thereby allowing a user to check the uploaded state of the content. In addition, the user can easily find out the content that the user wants to delete through the deletion confirmation interface 280 that is displayed together with the upload information. Thus, the user can execute the actual deletion of the content by a simple operation of selecting the upload information. Accordingly, it is possible to avoid a situation in which content to be deleted keeps remained. Furthermore, since the table can be also used as history of the past upload, a user can securely check and delete the content even when the user forgets the uploading.

In this embodiment, the terminal memory 212 keeps the table 260 therein until all upload information included in the table 260 is deleted.

However, regardless of the upload information, all data in the memory including the table 260 may be deleted by formatting the terminal memory 212. In this case, the terminal information display section 242, which allows the user to check the content and asks the user whether or not to delete the content, is operated. Thus, it is possible to avoid a situation in which the user misses the timing of easily deleting the content.

(Wireless Communication Method)

Next, a wireless communication method of operating content with the portable wireless terminal 110 will be described.

Figure 8:
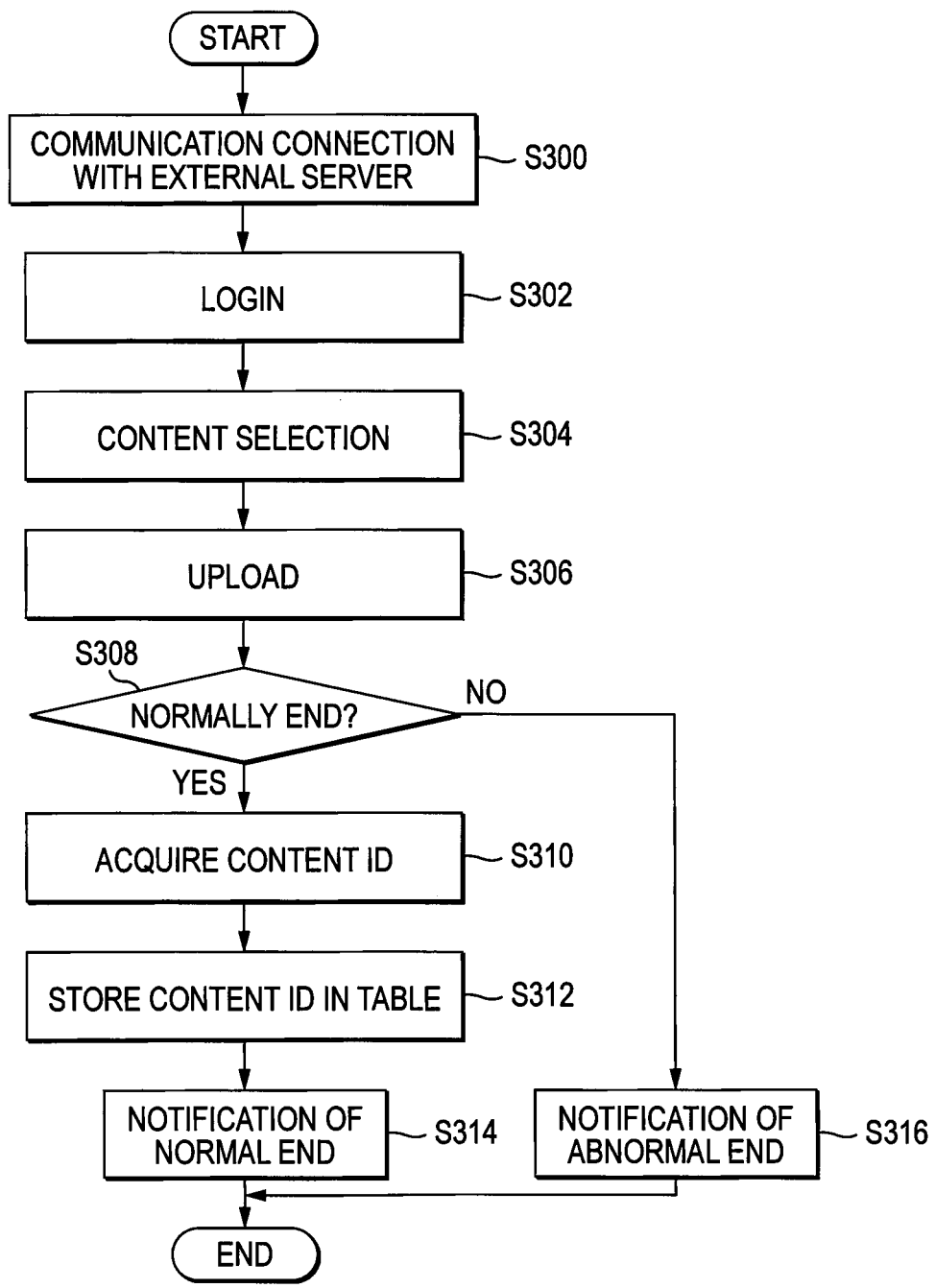
FIG. 8 is a flow chart showing a content upload of a wireless communication method according to the first embodiment.
Figure 9:
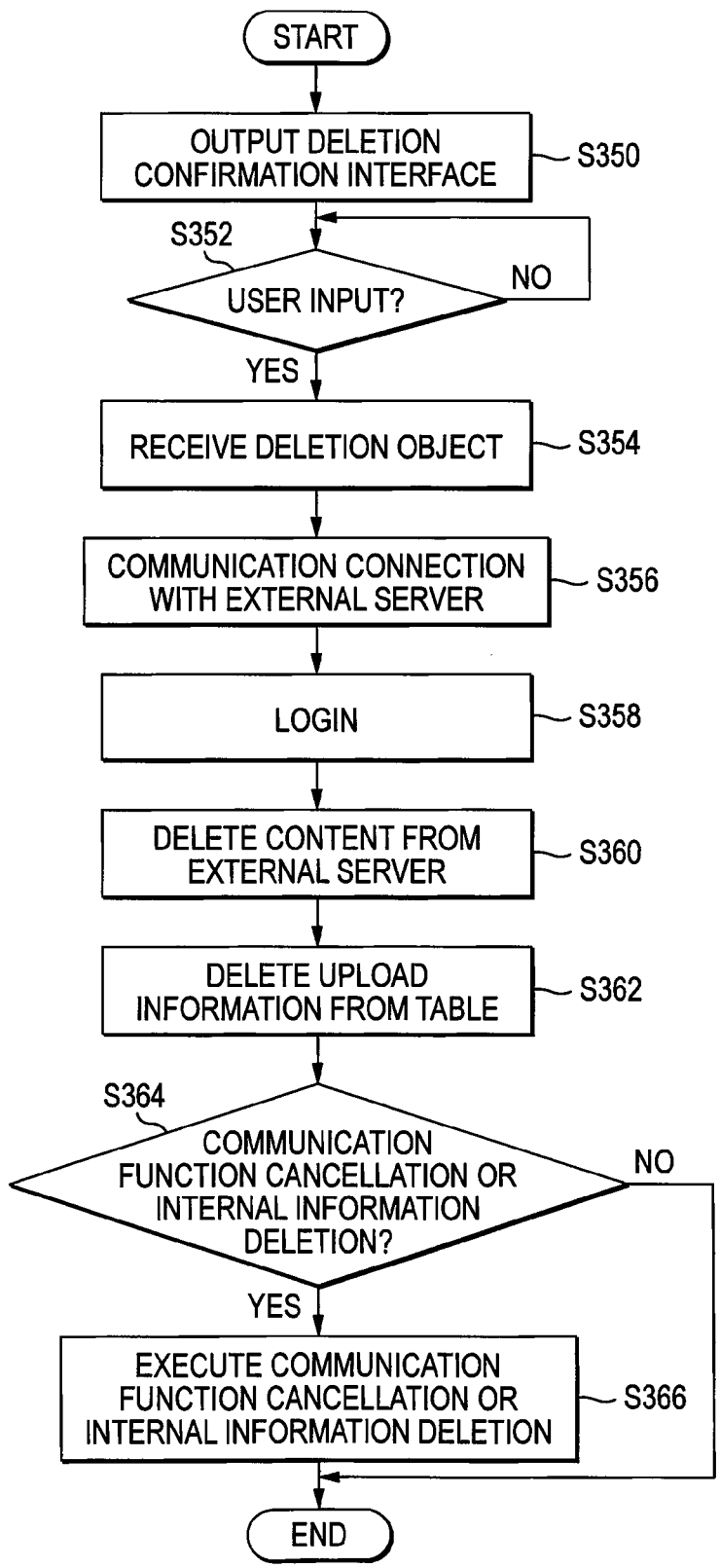
FIG. 9 is a flow chart showing a content deletion of a wireless communication method according to the first embodiment.

FIG. 8 is a flow chart showing a content upload of a wireless communication method and FIG. 9 is a flow chart showing a content deletion.

Referring to FIG. 8, the portable wireless terminal 110 performs communication connection with the external server 150 through the base station 120 and the communication network 130 (S300) and inputs the account information to login the external server 150 (S302). Then, the portable wireless terminal selects the content that is desired to be uploaded in accordance with the user input (S304) and performs a process of uploading the content (S306).

After performing the upload process, it is determined whether the upload process is normally ended (S308). When the upload process is normally ended (YES in S308), the portable wireless terminal obtains a content ID (S310), stores the content ID in the table 260 (S312) and notifies the user that the upload is completed (S314). When the upload process is not normally ended (NO in S308), the portable wireless terminal notifies the user that the upload process is not normally performed (S316).

Then, when the user tries to delete the content that has been uploaded in the past, as shown in FIG. 9, the portable wireless terminal 110 displays the deletion confirmation interface 280 of content that is specified by the upload information on the terminal display section 214 (S350). When the user inputs one or more pieces of the content via the deletion confirmation interface 280 (S352), the portable wireless terminal receives the one or more pieces of content as a deletion object (S354).

Next, the portable wireless terminal performs communication connection with the external server 150 that is an upload destination by using the site ID 270 of the table 260 (S356) and inputs the account information to login the external server 150 (S358). Then, the portable wireless terminal deletes the received content to be deleted from the external server 150 that is an upload destination by using the content ID and the account information.

Then, the portable wireless terminal 110 deletes the upload information of the content that is deleted by the content deletion section 246 from the table 260 (S362). When the content deletion is a deletion in response to the communication function cancellation or internal information deletion, i.e., when the content deletion is performed at the timing of the communication function cancellation or internal information deletion (S364), the communication function cancellation or internal information deletion is executed (S366).

Even with the wireless communication method, it is possible to allow a user to check the uploaded state of content by the uniform means. In addition, it is possible to avoid a situation in which content to be deleted keeps remained.

(Second Embodiment: Content Reference System)

In the first embodiment, the portable wireless terminal 110 independently completes the process and deletes the content. Although the same process is also executed in the second embodiment, a content reference system that connects a management server to the portable wireless terminal 110 is applied.

Here, the management server is a dedicated server of a communication provider, for example, and is connected to the portable wireless terminal 110 by a communication line different from the communication through the base station 120, such as wired cable.

(Management Server 400, Portable Wireless Terminal 410)

Figure 10:
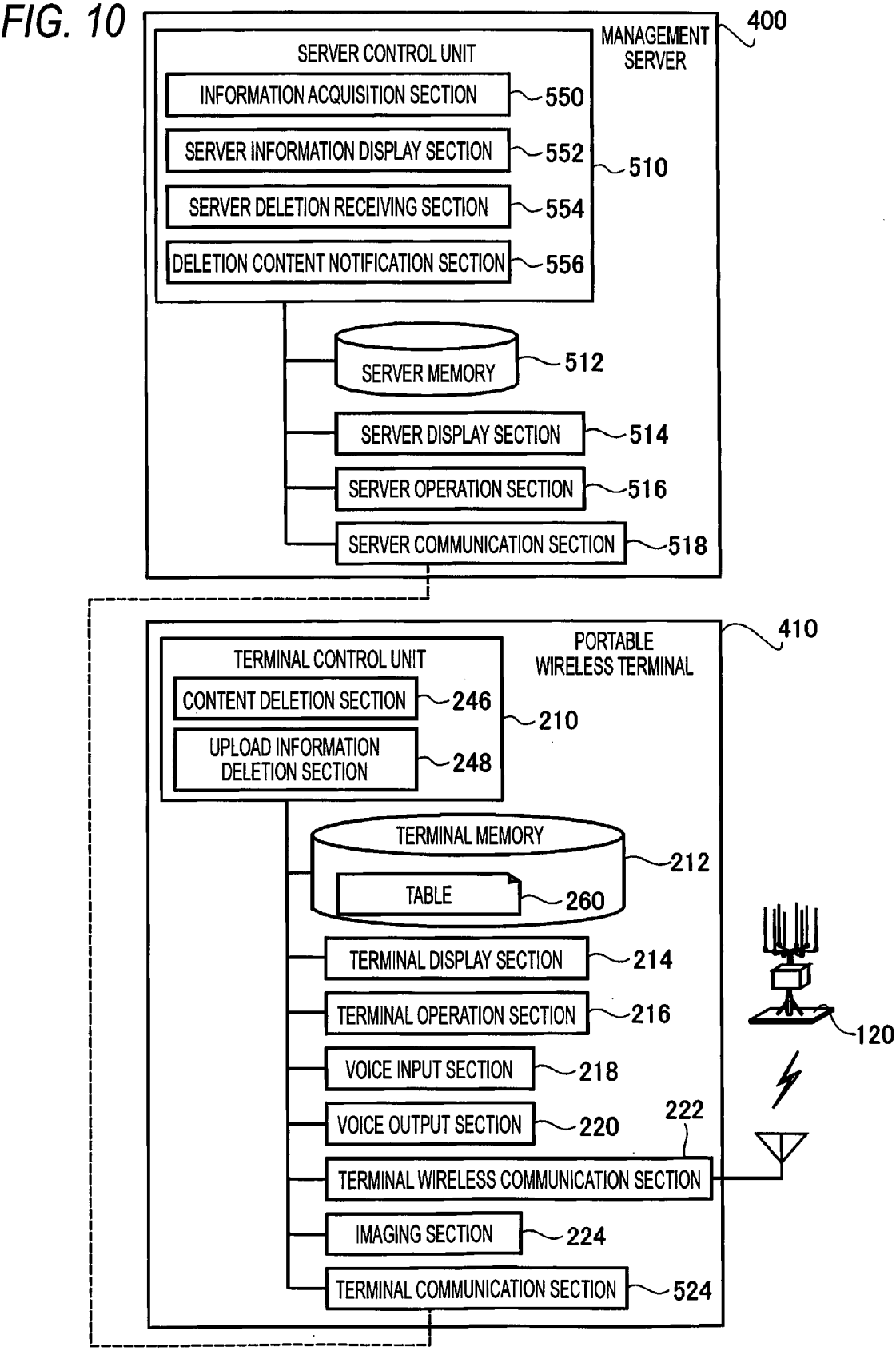
FIG. 10 is a function block diagram showing hardware configurations of a management server and a portable wireless terminal according to a second embodiment.

FIG. 10 is a function block diagram showing hardware configurations of a management server 400 and a portable wireless terminal 410 according to a second embodiment.

The management server 400 includes a server control unit 510, a server memory 512, a server display section 514, a server operation section 516 and a server communication section 518.

The server control unit 510 manages and controls the management server 400 by a semiconductor integrated circuit including a central processing section (CPU). The server memory 412 is configured by a ROM, a RAM, an EEPROM, a non-volatile RAM, a flash memory, an HDD and the like and stores programs and the like that are processed by the server control unit 510. The server display section 514 is configured by a liquid crystal display, an EL display, a PDP (Plasma Display Panel) and the like, which is larger than at least the terminal display section 214, and displays the internal information of the portable wireless terminal 410. The server operation section 516 is configured by a keyboard, a tenkey, and a movable switch such as joystick and the like and receives an operation input of a user. The server communication section 518 is connected with the portable wireless terminal 410 in a wireless or wired manner and performs communication with the portable wireless terminal 410.

In addition, the server control unit 510 serves as an information acquisition section 550, a server information display section 552, a server deletion receiving section 554 and a deletion content notification section 556.

The information acquisition section 550 acquires the table 260 in which the upload information is recorded from the terminal memory 212 of the portable wireless terminal 410.

The server information display section 552 displays, on the server display section 514, the information of the content in the deletion confirmation interface 280, which is specified by the upload information, based on the table 260 acquired by the information acquisition section 550.

When one or more pieces of content to be deleted is designated (selected) from the content information displayed via the deletion confirmation interface 280, the server deletion receiving section 554 receives the content group as a deletion object.

The deletion content notification section 556 notifies the portable wireless terminal 410 of the one or more pieces of content to be deleted which have been received by the server deletion receiving section 554.

The portable wireless terminal 410 includes the terminal control unit 210, the terminal memory 212, the terminal display section 214, the terminal operation section 216, the voice input section 218, the voice output section 220, the terminal wireless communication section 222, the imaging section 224 and a terminal communication section 524. The terminal communication section 524 is connected with the management server 400 in a wireless or wired manner and performs communication with the management server 400. The terminal control unit 210 also severs as the content deletion section 246 and the upload information deletion section 248. The configuration of the portable wireless terminal 410 is the substantially same as the constitutional elements of the portable wireless terminal 110 of the first embodiment and thus the overlapped explanations are omitted.

In the second embodiment, it is possible to allow a user to check the uploaded state of content by the uniform means, like the first embodiment. In addition, it is possible to avoid a situation in which the content to be deleted keeps remained.

In the second embodiment, the upload information of content that has been uploaded in the past can be checked and deleted through the separate management server 400. For example, when the management server 400 is provided with a monitor (server display section 514) larger than the portable wireless terminal 410, it is possible to easily find out the content that a user wants to delete. In addition, when the management server 400 has higher processing performance than the portable wireless terminal 410, it is possible to reduce the consumption time necessary for a deletion process and to thus improve the efficiency of procedure such as cancellation.

Although the preferred embodiments of the present invention have been described, it should be noted that the invention is not limited thereto and can be modified and changed by one skilled in the art within the scope of the claims, which are intended to be included in the technical scope of the present invention.

For example, in the above embodiments, a user deletes the content and can delete individual content or all contents by user's own intention. However, the present invention is not limited thereto. For example, when a portable wireless terminal is canceled, a communication provider may forcibly delete content uploaded by the portable wireless terminal for the purpose of securing resources. It should be understood that the forced content deletion or deletion by a third party having the right to delete content is within the technical scope of the present invention.

In the meantime, the respective constitutional elements of the content reference system according to the second embodiment are not limited to the above arrangement. For example, the respective constitutional elements may be provided to both the management server 400 and the portable wireless terminal 410 inasmuch as the functions thereof can be performed.

In the meantime, the respective processes of the wireless communication method are not necessarily performed time-serially in accordance with the procedures shown in the flow chart and may be performed in parallel or include processing by a subroutine.

This application claims the priority of Japanese Patent Application No. 2008-195033 filed on Jul. 29, 2008, the disclosures of which are incorporated herein by reference.

INDUSTRIAL APPLICABILITY

The present invention can be applied to a portable wireless terminal that can refer to content uploaded to an external server, a wireless communication method and a content reference system.

DESCRIPTIONS OF REFERENCE NUMERALS 110, 410: portable communication terminal
150: external server
212: terminal memory
214: terminal display section
240: execution command addition section
242: terminal information display section
244: terminal deletion receiving section
246: content deletion section
248: upload information deletion section
260: table
280: deletion confirmation interface
400: management server
514: server display section
524: terminal communication section
550: information acquisition section
552: server information display section

554: server deletion receiving section
556: deletion content notification section

The invention claimed is:

1. A portable wireless terminal comprising:
   a display module;
   a memory operable to store information of first and second images, the first and second images stored in an external server located outside the portable wireless terminal;
   a control module operable to cause the display module to display a list, the list comprising first and second thumbnails of the first and second images, respectively;
   an input module operable to receive a user input to select the first thumbnail, wherein the control module causes the display module to display a mark for the first thumbnail in response to selection of the first thumbnail; and
   a deletion module operable to delete the first image in the external server after display of the mark,
   wherein even if a communication function of the portable wireless terminal is cancelled or internal information in the portable wireless terminal is deleted, the control module is operable to cause the display module to display the list and the deletion module is operable to cause the external server to delete the first image.

2. The portable wireless terminal according to claim 1,
   wherein the mark includes a check of a check box displayed for the first image to be deleted.

3. The portable wireless terminal according to claim 1, further comprising:
   an information deletion module operable to delete the information of the first image.

4. The portable wireless terminal according to claim 1, further comprising:
   an execution command addition module operable to, when uploading content to the external server, associate a deletion execution information used for deleting the first image.

5. The portable wireless terminal according to claim 4,
   wherein the deletion execution information includes access information to the external server and a content ID of the uploaded content.

6. A method for deleting one or more images in an external server using a portable wireless terminal, the method comprising:
   storing information of first and second images, the first and second images stored in an external server located outside the portable wireless terminal;
   displaying a list comprising first and second thumbnails of the first and second images, respectively on a display;
   receiving a user input to select the first thumbnail,
   displaying a mark for the first thumbnail on the display in response to a reception of the user input; and
   deleting the first image in the external server after the mark has displayed on the display,
   wherein even if a communication function of the portable wireless terminal is cancelled or internal information is deleted, the displaying the list and the deleting the first image in the external server are executed.

7. The wireless communication method according to claim 6,
   wherein the mark includes a check of a check box displayed for the first image to be deleted.

* * * * *